United States Patent [19]
Mayeda et al.

[11] Patent Number: 5,454,191
[45] Date of Patent: Oct. 3, 1995

[54] FLEXIBLE POUCH-LIKE HANGING BASKET LINER

[76] Inventors: Ted Mayeda, 656 W. Palmyra, Orange, Calif. 92668; Richard Mayeda, 392 N. Tustin St., Orange, Calif. 92667

[21] Appl. No.: 209,836

[22] Filed: Mar. 11, 1994

[51] Int. Cl.⁶ .................................................. A01G 9/02
[52] U.S. Cl. .......................... 47/66; 47/72; 47/76
[58] Field of Search ................ 47/66 B, 76 WB, 47/74

[56] References Cited

U.S. PATENT DOCUMENTS

| | | | |
|---|---|---|---|
| 1,624,504 | 4/1927 | Pfarr | 47/67 |
| 2,097,929 | 11/1937 | Lovett | 47/66 B |
| 3,094,810 | 6/1963 | Kalpin | 47/66 B |
| 3,818,633 | 6/1974 | Sable | 47/67 |
| 4,771,573 | 9/1988 | Stengel | 47/72 |
| 4,914,860 | 4/1990 | Richardson | 47/72 |
| 5,018,300 | 5/1991 | Chiu et al. | 47/67 |
| 5,070,645 | 12/1991 | Vaughn | 47/72 |
| 5,171,390 | 12/1992 | Travers | 47/76 WB |
| 5,311,700 | 5/1994 | Thomas | 47/76 WB |

FOREIGN PATENT DOCUMENTS

| | | | |
|---|---|---|---|
| 3512507 | 10/1986 | Germany | 47/83 |
| 3621614 | 1/1988 | Germany | 47/83 |
| 4019446 | 1/1991 | Germany | 47/74 |
| 49307 | 7/1993 | Japan | 47/74 |
| 161005 | 4/1933 | Switzerland | 47/72 |
| 2152345 | 8/1985 | United Kingdom | 47/83 |

OTHER PUBLICATIONS

Sphagnum moss, Coconut fiber, Fiberboard (commonly used hanging basket liners).

*Primary Examiner*—Henry E. Raduazo
*Attorney, Agent, or Firm*—Walter A. Hackler

[57] ABSTRACT

Disclosed is a hanging basket liner for lining wire and other types of hanging baskets designed to hold live, growing plants and flowers or artificial plants and flowers. The liner is of a generally pouch-shape construction with an opening at the top. The liner is made of a flexible material to conform to the shape of a hanging basket and also to provide a pleasing and aesthetic appearance. When necessary, the interior of the liner is covered by an additional water controlling material to help appropriately retain moisture and water within the basket, reduce excessive drainage and reduce the drying out of the growing medium. The liner is easily installed and comes in a variety of sizes and shapes to custom fit a hanging basket. The liner can be easily punctured or cut so that the sides and bottom of a hanging basket can also be planted. The liner is durable, long lasting and reuseable.

11 Claims, 9 Drawing Sheets

FLEXIBLE POUCH-LIKE HANGING BASKET LINER

BACKGROUND—FIELD OF INVENTION

This invention relates to a liner for hanging baskets, and particularly, a liner for wire hanging baskets designed to hold live or artificial plants and flowers.

BACKGROUND—DESCRIPTION OF PRIOR ART

Most of the homes in the western world have gardens, patios, atriums, porchways or overhangs where the occupants seek to cultivate live plants and flowers to enhance the beauty and appearance of the home. In addition, many business premises and public open-air places have landscaping and planters as an integral part of their planning or architecture. In order to create attractive garden scenes and views in public or private places, detailed planning and design has to be followed by preparation and installation, which due to the lack of automated methods, is very labor intensive. The hanging basket is an excellent means of displaying one's horticultural creativity and can be utilized even where there is no ground level planting area available. It can be displayed in a multitude of places and, when the traditional wire basket is used, maximum use can be made of the plant growing area by using the top, bottom and sides of the basket.

Unfortunately the preparation, filling and planting of wire baskets is one of the most time consuming and labor intensive of gardening activities. This is a deterrent to many people and thus the making up of wire baskets been mainly done by professionals or enthusiastic amateurs. The most commonly used medium for lining wire hanging baskets is sphagnum moss which, although it gives a very pleasing, natural and aesthetic look to the finished hanging basket, is a very tedious and messy medium with which to work. The sphagnum moss method entails taking the dried moss, which is brittle and crumbly, and soaking it in water to make it sufficiently pliable to mold it around the interior of the basket. This is time consuming and requires skill and experience to produce a consistent and functional lining.

There are several problems with the moss method. These include the level of skill required to create an effective lining and to avoid using too much moss thus causing unnecessary waste. Another problem with the sphagnum moss method is that it is very labor intensive and it takes time for a homeowner to properly line baskets with moss and in a plant business this time is reflected in the higher cost to the customer of the finished moss basket. The sphagnum moss also has poor water retaining capabilities and allows moisture and water to escape. Thus the basket dries out very quickly and the plants in the basket require more frequent watering. This points to another problem of water waste due to excessive drainage. When watering the plants in a sphagnum moss basket the water is poorly retained especially around the top 2 inch wide rim area. Moss does not have ablity to hold water until it has time to thoroughy soak down through the growing medium. The water tends to run down the outsides of the basket and not through the growing medium where it is needed. The water is not being fully utilized and the basket has to be watered again until the growing medium is properly saturated thus creating more waste water.

There are three other types of liners available for wire hanging baskets. These are, firstly, a molded liner made from compressed fiber board; secondly, a flexible matting liner made from coconut fiber; and thirdly, a flexible foam rubber liner with a covering of sphagnum moss on its outer surface. The fiber board liner is of rigid construction which gives it strength but does not allow it to be molded to the shape of the basket. It also does not facilitate the growing of plants from the sides and base. The coconut matting liner can be molded to the shape of the basket but is made mainly for the shallow type of basket. It comes in a limited number of sizes and frays very easily when it is cut or trimmed to fit varying basket shapes and sizes. The foam rubber liner can also be molded to the shape of the basket but it comes in only one size and therefore must be cut and trimmed to fit different basket sizes and shapes. As is the case with the sphagnum moss liner, the coconut matting liner and the foam rubber liner are also unable to best utilize water resources and lack the high water retaining properties neccesary to prevent excessive water drainage and evaporation. All previous methods of lining a wire hanging basket suffer from one or more of the following disadvantages:

a) The liner is hard to install because of the time and skill requirements needed to produce a functional basket.

b) The liner is hard to install because the limited number of liner sizes and shapes may neccesitate extra cutting and trimming for a good basket fit.

c) The liner does not provide a flexible and highly efficient water retaining barrier to prevent excessive drainage when watering a basket and cannot contain the water until it has time to trickle through the growing medium thus causing water waste and extra plant maintenance.

d) The liner does not provide a flexible and highly efficient water retaining barrier to reduce excessive water evaporation due to sun and wind exposure thus causing the growing medium to dry out faster and require more frequent watering.

e) The liner does not facilitate easy planting of the sides and bottom of a basket thus preventing maximum use of the plant growing area.

f) The liner is messy to work with and over a period of time suffers from excessive falling debris thus requiring extra clean up maintenance.

The objective of the invention is to provide a liner for wire hanging baskets which overcomes the problems of the other methods of lining and at the same time produces a pleasing and aesthetic appearance to the completed basket. As the invention is also simple to work with and requires minimal skill and experience it will allow a greater number of gardeners to produce their own hanging baskets.

SUMMARY OF THE INVENTION

In accordance with this invention, there is provided a liner for hanging baskets, in particular wire hanging baskets, which will permit easy preparation of the baskets, will help best utilize water resources thus minimizing plant maintenance and will enhance the look of the hanging baskets because of its pleasing and aesthetic appearance. An advantage of the liner of this invention is the simplicity with which it can be fitted to a hanging basket. The liner is very flexible and comes in many different sizes and shapes to custom fit various baskets and therefore can be properly fitted much quicker and easier than other methods of lining a basket. Another feature is that the liner is a clean medium with which to work and reduces extra cleanup maintenance.

Another advantage of the liner is that it acts as a highly efficient water controlling barrier that helps best utilize water during the process of watering the basket. The liner reduces water waste because its water controlling capabilities help hold water, especially around the top 2 inch rim area of the liner, and direct water flow down to thoroughly saturate the growing medium. Excess water is allowed to exit through the bottom portion of the liner thus preventing waterlogging of the plant's roots. Also a feature of the liner is that it acts as a weather barrier which reduces the drying out of the growing medium caused by sun and winds. The liner's ability to controll excessive water loss and execessive water evaporation helps solve a problem common with most other methods of lining.

A characterizing feature of the liner is that its general outward appearance can have a fibrous texture and natural color or can have a variety of texture and color combinations depending on the material used to construct the liner. Therefore the liner will appeal to a wider spectrum of personal tastes. Another advantage of the liner, due to its flexibilily and installed thinness, is that it allows maximum space in the basket for the growing medium. An additional feature is that the liner can be easily cut or punctured to permit the placing of plants in the walls of the wire basket thus making full use of the plant growing area.

Accordingly, several advantages of the invention are:

a) The liner is easy to install because time and skill requirements needed to produce a functional basket are minimal.

b) The liner is easy to install because it comes in many different sizes and shapes designed to a custom fit a basket and eliminates the neccesity for extra cutting and trimming.

c) The liner provides a flexible and highly efficient water controlling barrier to prevent excessive drainage when watering a basket and contains the water until it has time to trickle through the growing medium before draining out the bottom thus saving water and plant maintenance time.

d) The liner provides a flexible and highly efficient water controlling barrier which reduces excessive water evaporation due to sun and wind exposure, prevents the growing medium from drying out faster and reduces watering frequency.

e) The liner facilitates easy planting of the sides and bottom of a basket thus allowing maximum use of the plant growing area.

f) The liner is clean and neat to work with and over the life of the basket remains relatively free of falling debris thus reducing clean up problems.

These and other advantages will become apparent from a consideration of the ensuing description and drawings.

DETAILED DESCRIPTION OF THE DRAWINGS

Figure 1:
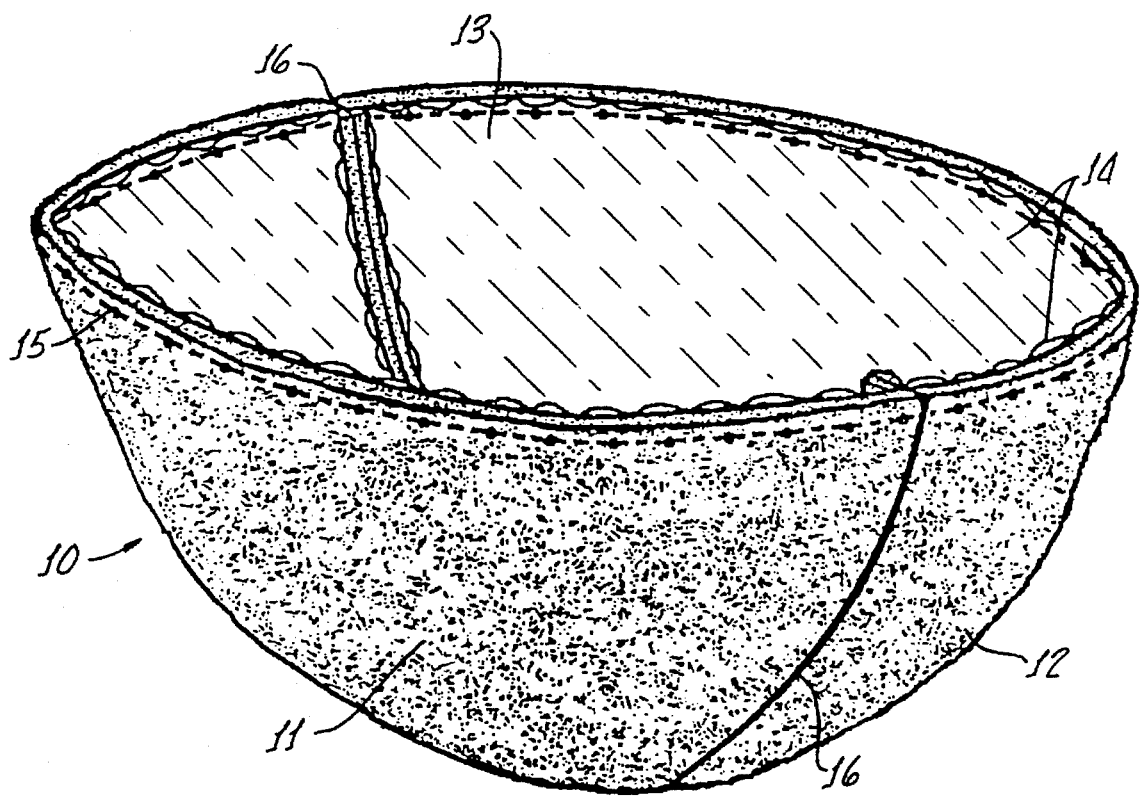
FIG. 1 is a perspective view of one embodiment of this invention having a lining structure of flexible material and when necessary an additional water controlling material covering the interior surface of the lining structure.

Referring to FIG. 1, there is illustrated an overall perspective view of one embodiment of a hanging basket liner 10 of this invention displayed in open or installed position. Liner 10 is of a generally pouch-shape configuration with an opening at the top. Liner 10 is comprised of a lining structure 11, which has an exterior surface 12 and an interior surface 13. Lining structure 11 is made of a flexible material such as fabric or paper to provide a pleasing appearance. When necessary to enhance the water retaining properties of lining structure 11, an additional water controlling material 14 normally covers interior surface 13 of lining structure 11. Additional water controlling material 14 is usually a plastic film or a coating material which helps provide an appropriate water retaining barrier. Liner 10 is contructed by sewing together pattern cut sections(FIG. 2) and a top plain seam 15 and a bottom plain seam 16 are the preferred method of attachment. The liner of this invention is made in various sizes and shapes to custom fit all the most commonly used wire hanging baskets.

Figure 2:
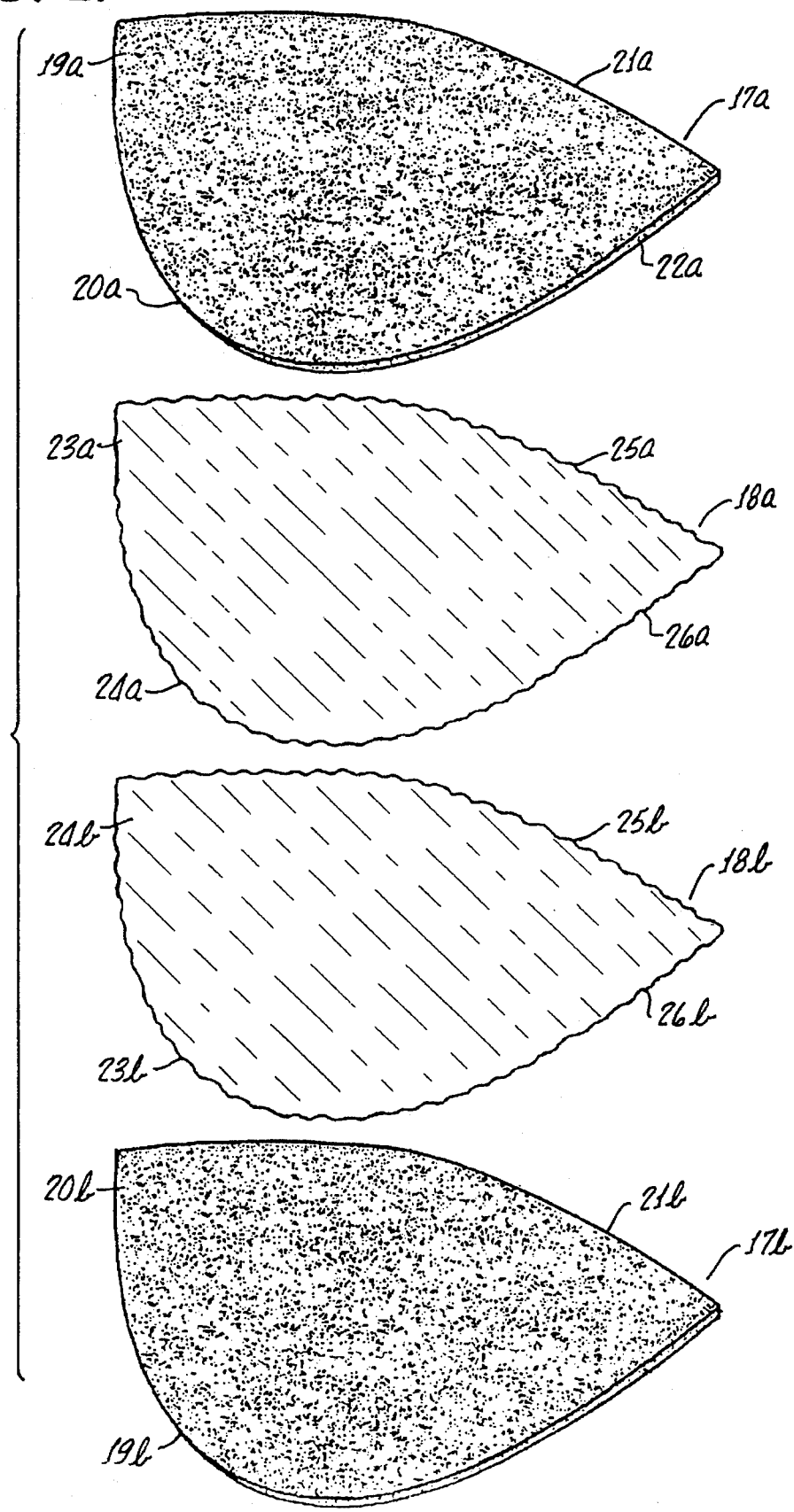
FIG. 2 is an exploded perspective view of the hanging basket liner when laying flat prior to sewing and depicts four pattern cut sections of materials from which the liner is made.

Referring to FIG. 2, there is depicted the liner of this invention before being sewn, laying flat and in an exploded perspective view. The liner is usually made from a four piece pattern utilizing two lining structure sections 17a and 17b and two additional water controlling material sections 18a and 18b that have all been precisely cut to custom fit a wire hanging basket when sewn together. Lining structure sections 17a and 17b have front surfaces 19a and 19b, back surfaces 20a and 20b, top edge surfaces 21a and 21b and bottom edge surfaces 22a and 22b. Additional water controlling material sections 18a and 18b have front surfaces 23a and 23b, back surfaces 24a and 24b, top edge surfaces 25a and 25b and bottom edge surfaces 26a and 26b.

Figure 3:
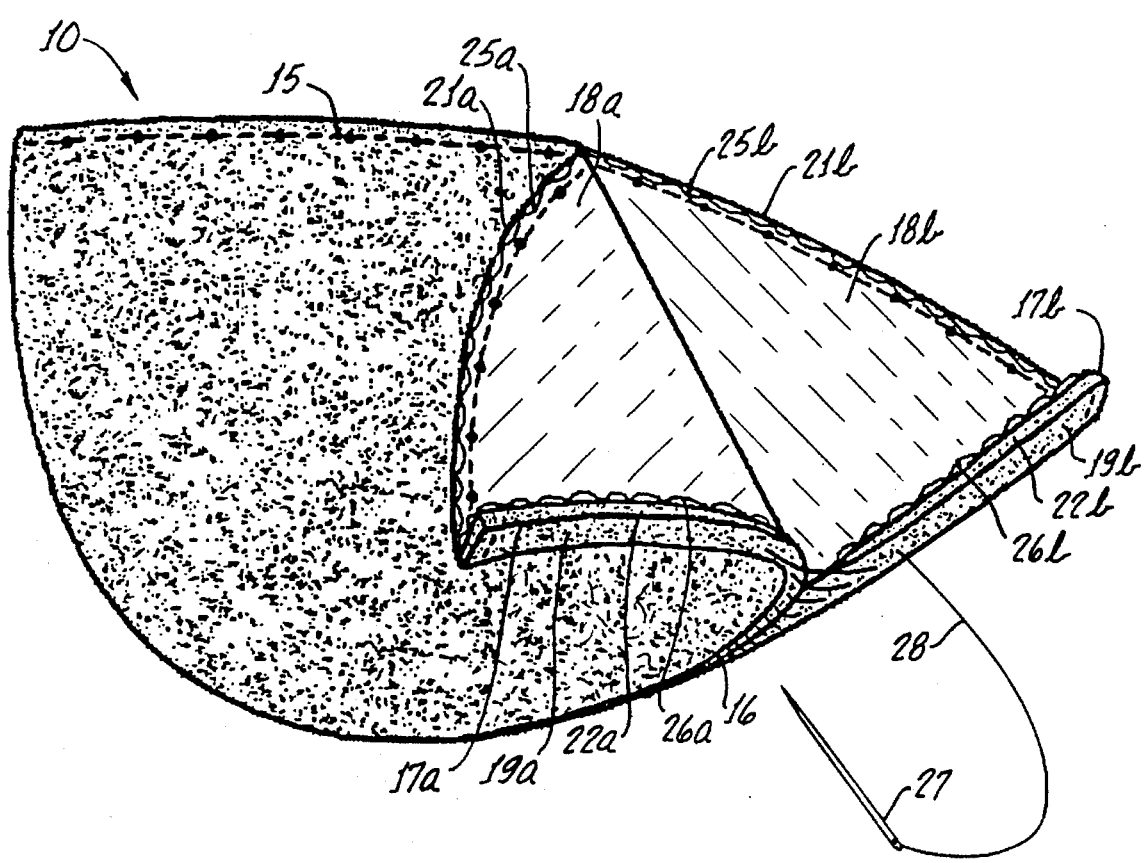
FIG. 3 is a perspective view of the liner laying in flat or closed position and shows the four sections being sewn together to construct a pouch-shape configuration.

Referring to FIG. 3, there is illustrated liner 10 laying in closed or flat position in perspective view and in the process of being sewn as is represented by a needle 27 and a thread 28. Lining structure section 17a and additional water controlling material section 18a are aligned and sewn together with top plain seam 15 running approximately ¼ of an inch in from top edge surfaces 21a and 25a. In a similar manner, lining structure section 17b and additional water controlling material section 18b are sewn together with top plain seam 15 running approximately ¼ of an inch in from top edge surfaces 21b and 25b. Sections 17a, 18a, 18b and 17b are aligned and sewn together with bottom plain seam 16, which runs through four sections and approximately ⅜ of an inch in from bottom edge surfaces 22a, 26a, 26b and 22b in such a manner that lining structure front surfaces 19a and 19b are in partial contact with each other.

Figure 4:
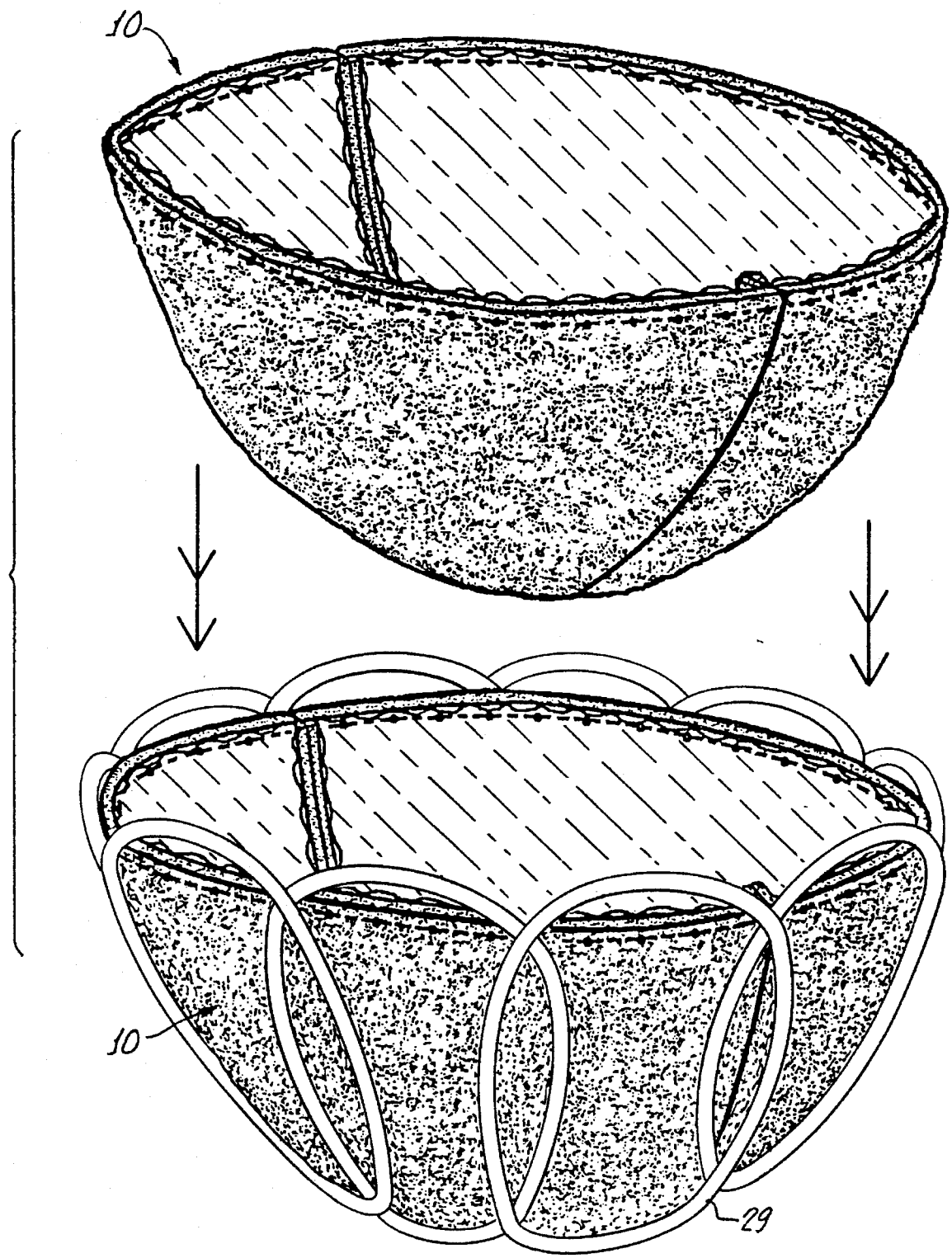
FIG. 4 is a perspective view of the present invention in installed or open position and shows the shape it takes as it is fitted to a wire hanging basket.
Figure 5:
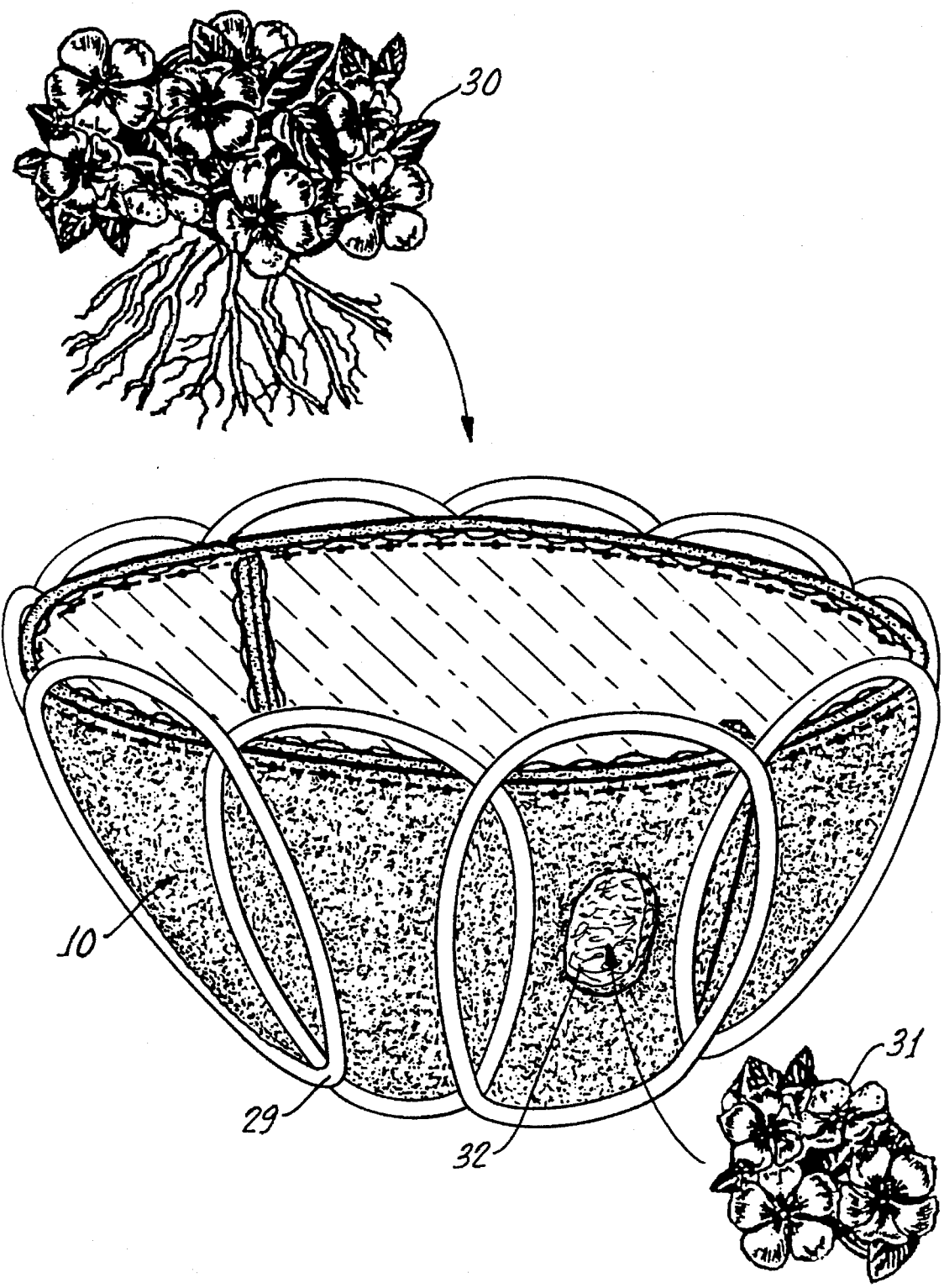
FIG. 5 is a perspective view of the liner fitted to the wire basket prior to the filling with growing medium and placing of the plants.

Referring to FIG. 4, there is illustrated the flexibility and ease with which liner 10 can be properly fitted to a wire hanging basket 29. Liner 10 is a clean medium with which to work and is very simple to install. Referring to FIG. 5, in perspective view is shown liner 10 fitted to wire basket 29 and illustrates how a vertical growing plant 30 would be placed inside the basket. Also illustrated is how a trailing plant 31 would be placed through a side perforation 32 which can be made by simple cutting or piercing.

Figure 6:
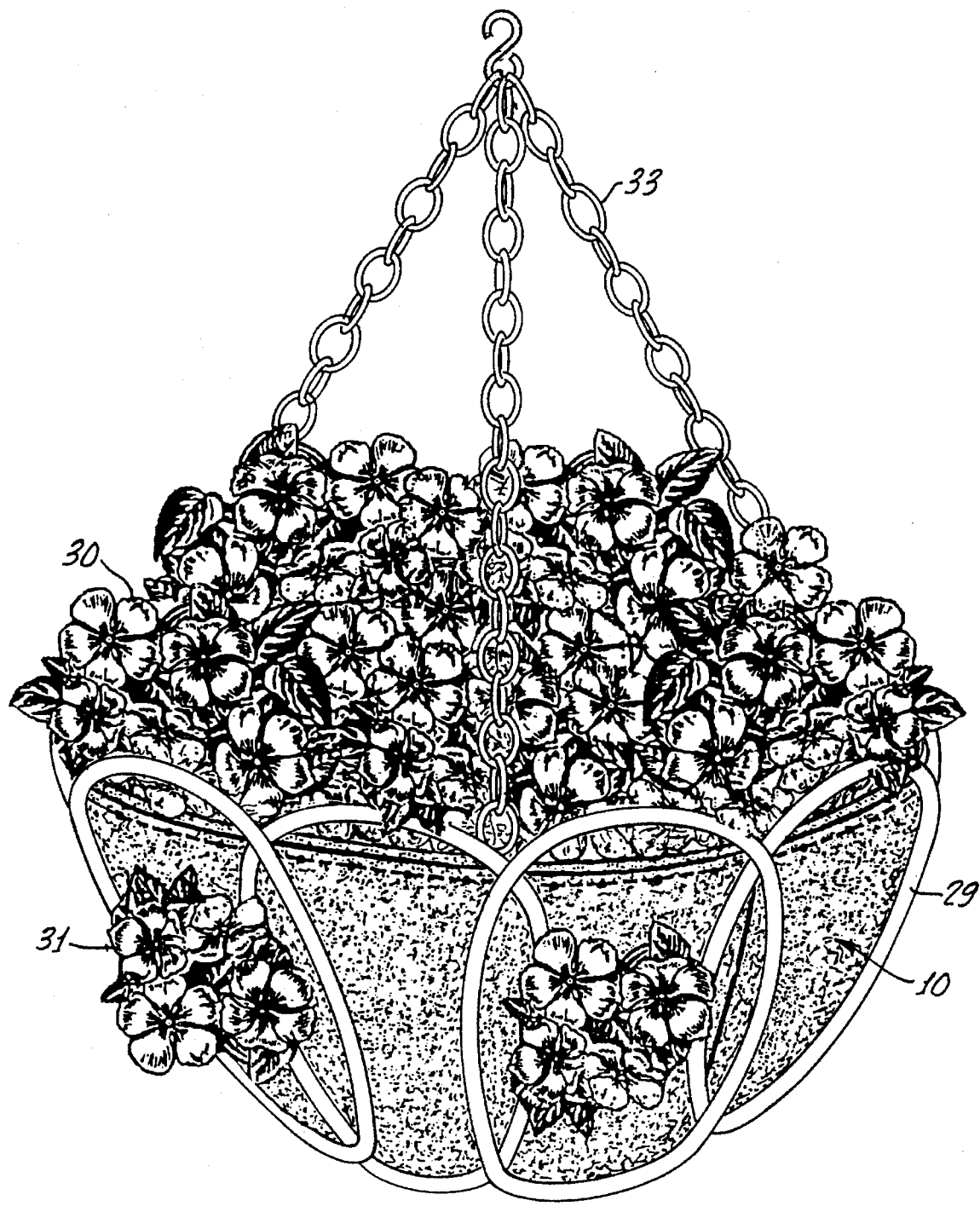
FIG. 6 is a perspective view of the liner fitted to the wire hanging basket after adding the growing medium and plants.

As shown in FIG. 6, the hanging basket liner of this invention blends into wire basket 29 with an attached hanger 33 and, after planting with vertical growing plants 30 and trailing plants 31, now starts to function as a protector of the growing medium from erosion and drying out. The water controlling properties of liner 10 help best utilize water during the process of watering the hanging basket and also prevent excessive water evaporation. Thus liner 10 extends the intervals between waterings necessary for the healthy growth and prolonged life of the plants in the basket.

Figure 7:
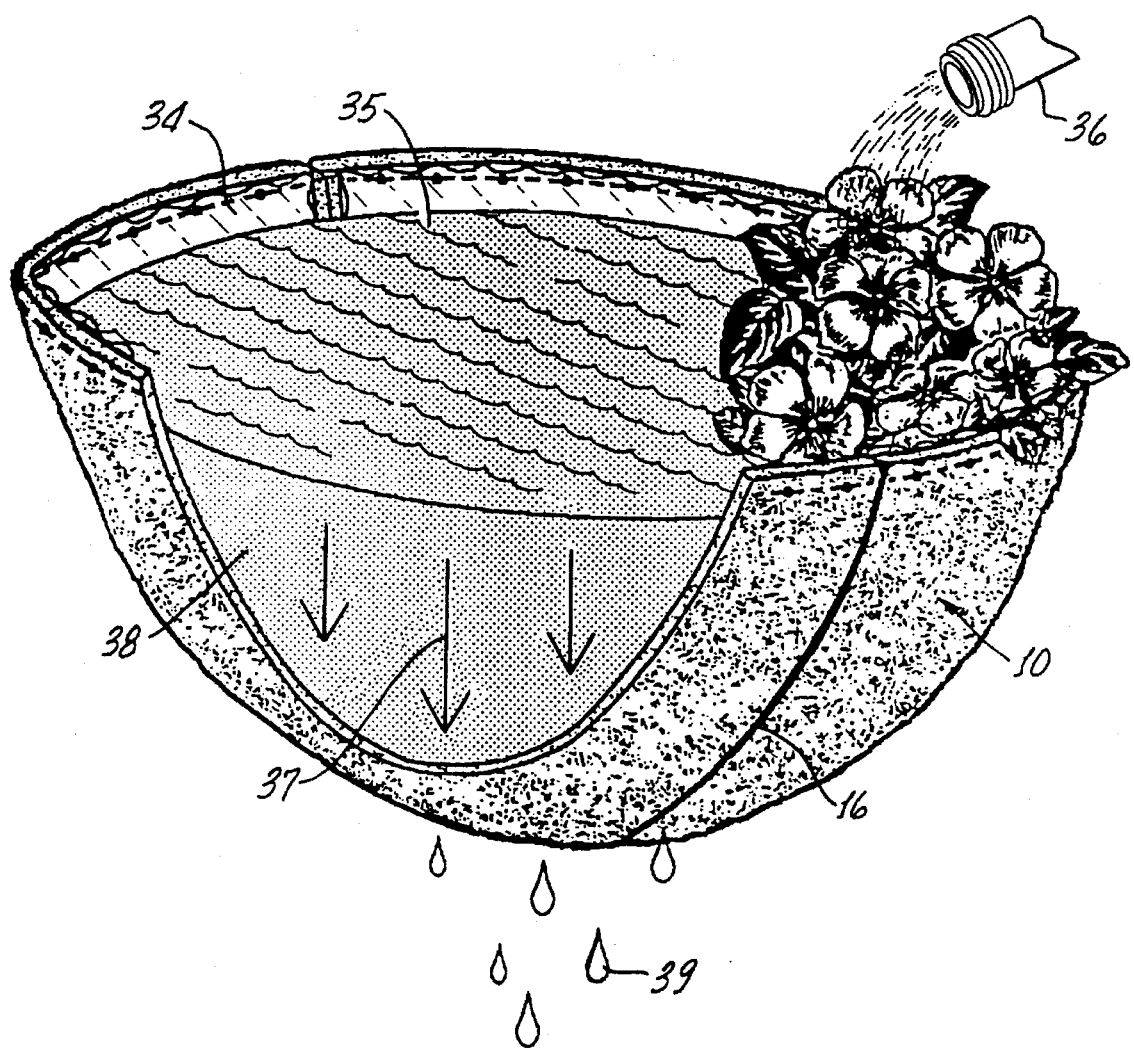
FIG. 7 is a simplified perspective view of the present invention with a cut away portion to illustrate the water controlling properties of the liner.

FIG. 7 is a simplified illustration of liner 10 in perspective view and with a cut away portion to depict the water controlling capabilities of the liner. The liner of this invention, especially a top rim area 34, helps hold a water supply 35 when applied by a water source 36 and directs a water flow 37 down to thoroughly saturate a growing medium 38. A water drainage 39 is directed mainly through the lower area of bottom plain seam 16 thus preventing waterlogging of the plant's roots. Liner 10 also acts as a weather barrier which reduces the drying out of growing medium 38 caused by exposure to sun and wind.

Figure 9:
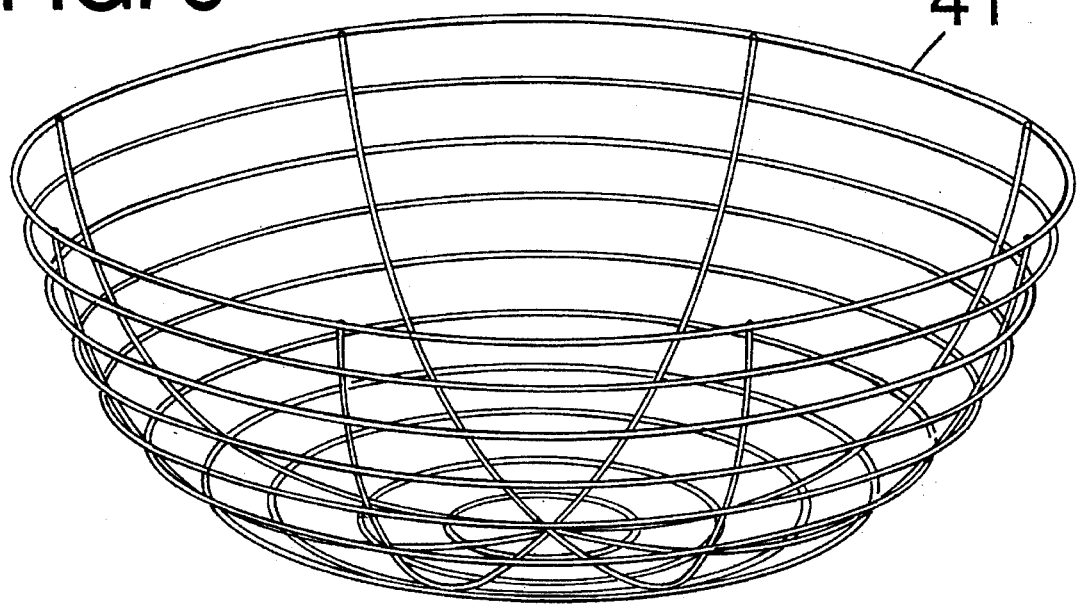
FIG. 9 illustrates a round, shallow style of wire hanging basket.
Figure 8:
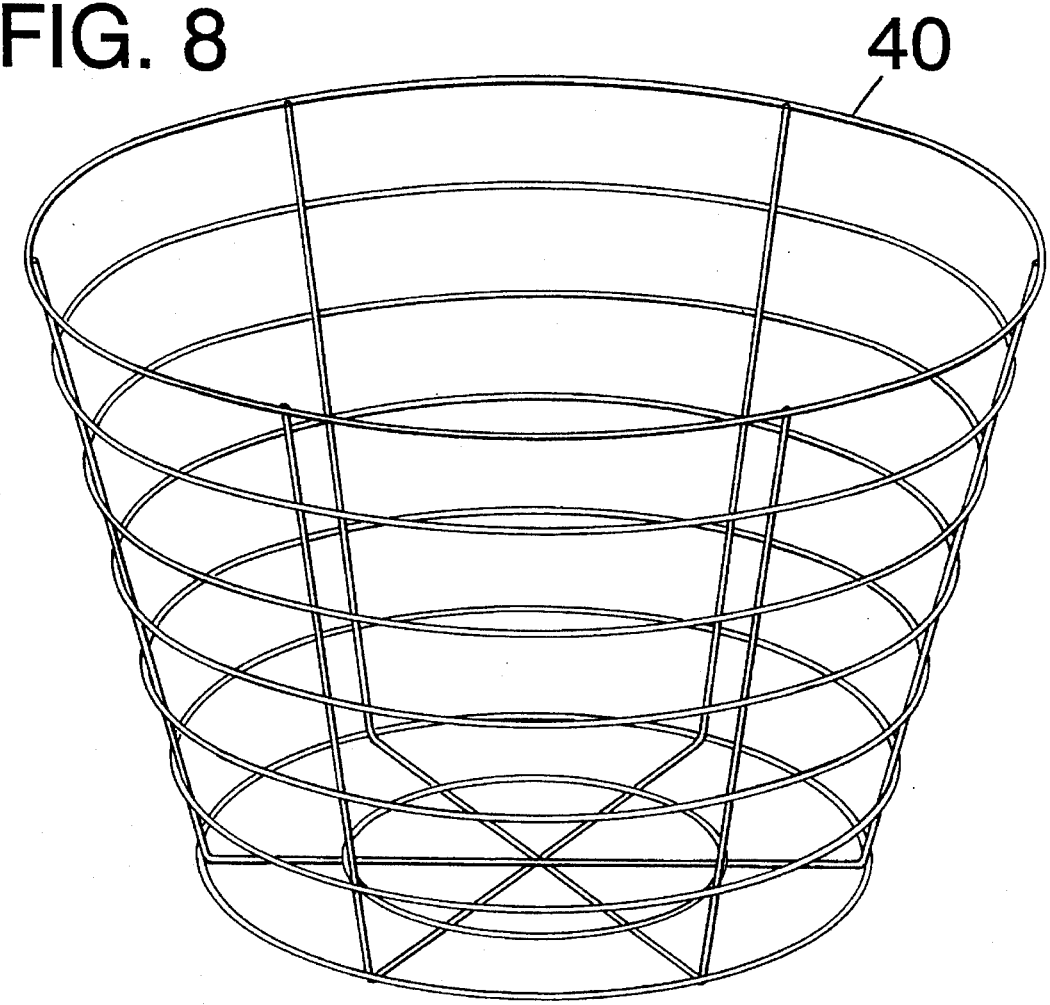
FIG. 8 illustrates a round, deep style of wire hanging basket.
Figure 10:
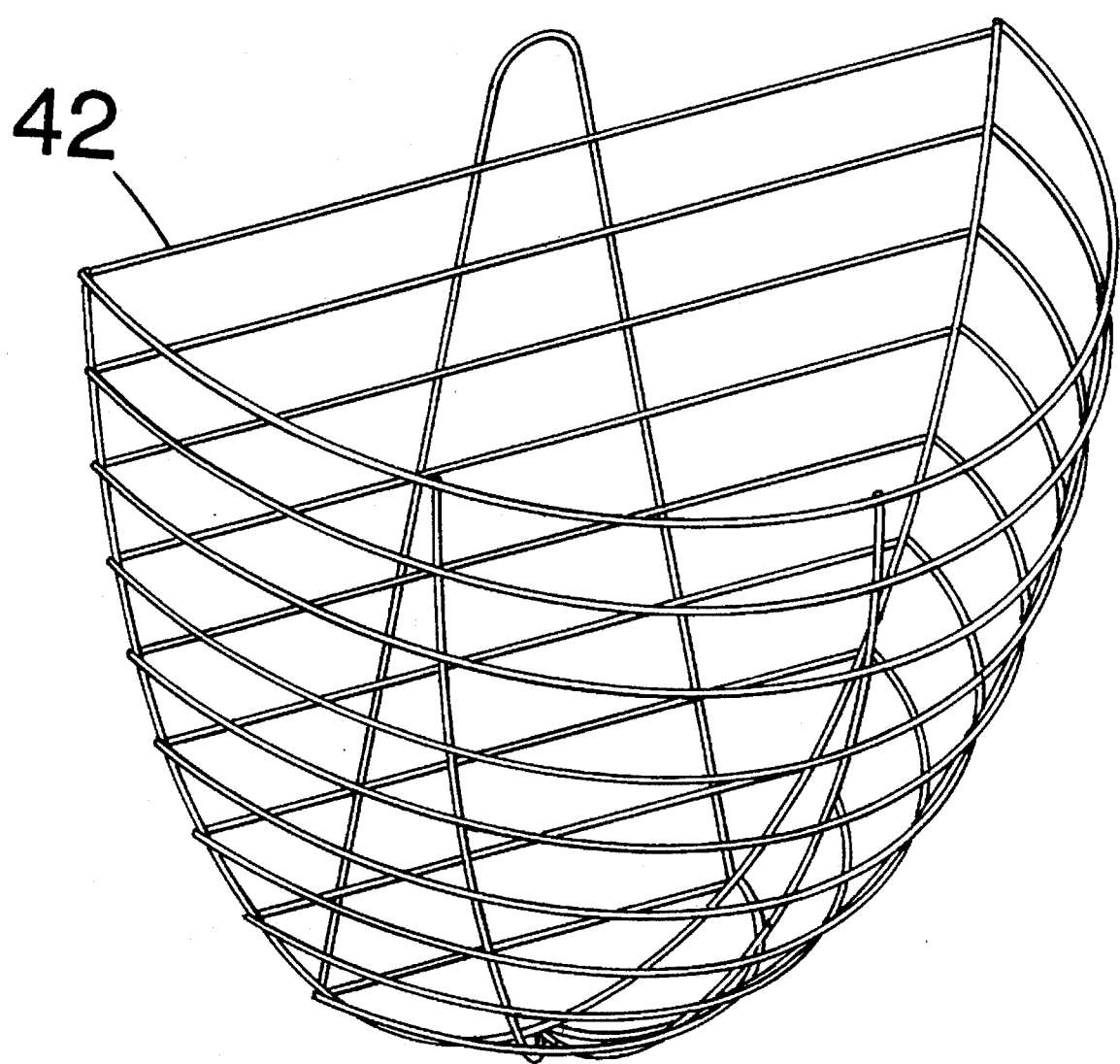
FIG. 10 illustrates a 'D'-shaped wall mount wire hanging basket.

Referring to FIGS. 8 through 10, some of the most widely utilized styles of wire hanging baskets are depicted. FIG. 8 shows a round, deep style basket 40 that is used for transplanting mature plants with large root systems. The larger floral displays are often planted in a round, shallow style basket 41 illustrated in FIG. 9. The wire basket shown in FIG. 10 is a 'D'-shaped wall mount style basket 42 and the liner of this invention will custom fit this and other shapes and sizes of wire hanging baskets.

To summarize, a number of advantages of the liner of this invention are:

a) The liner can be quickly and easily installed thus helping the homeowner to make professional looking baskets and also saves time and money for plant related businesses that deal with wire hanging baskets.

b) The liner comes in a wide variety of sizes and shapes to custom fit today's most commonly used wire hanging baskets and is very easy to use since no extra cutting or trimming is necessary.

c) The liner has an improved ability to hold water when watering a basket and allows the water to thoroughly soak the growing medium before draining out the bottom portion of the liner thereby reducing excessive drainage and saving water and maintenance time.

d) The liner acts as an improved weather barrier to prevent excessive loss of moisture due to sun and wind conditions thus increasing the amount of time between waterings.

e) The liner can easily be cut or punctured to permit side and bottom planting thus taking full advantage of the plant growing area.

f) The liner is clean to work with and over the life of the basket retains its general integrity thus reducing clean up maintenance.

The above description presents the best mode contemplated of carrying out the present invention as depicted by the embodiments disclosed. The features illustrated by these embodiments provide the advantages of this invention. This invention is, however, susceptible to modifications and alternate constructions from the embodiments shown in the drawings and described above. Consequently, it is not intended to limit it to the particular embodiments disclosed. On the contrary, the intention is to cover all modifications and alternates falling within the scope of the invention as generally expressed by the following claims:

We claim:

1. A hanging basket liner comprising:

a flexible outer layer, including two sections joined together to form a pouch configuration, sized for lining a conventional wire hanging basket designed to hold plants and plant growing medium;

water resistant inner layer means, disposed on an interior surface of said flexible outer layer, for controlling water in the hanging basket by holding a water supply for a sufficient time to soak the growing medium while preventing waterlogging of plant roots; and means for permitting water drainage through the liner.

2. The hanging basket liner according to claim 1 wherein the water resistant inner layer means is plastic.

3. The hanging basket liner according to claim 1 wherein said water resistant inner layer means is a synthetic resinous film.

4. The hanging basket liner according to claim 1 wherein said flexible outer layer is comprised of a non-woven fabric material.

5. The hanging basket liner according to claim 4 wherein the non-woven fabric material is made of plastic fibers.

6. The hanging basket liner according to claim 1 wherein said flexible outer layer is comprised of a paper material.

7. The hanging basket liner according to claim 1 wherein the means for permitting water drainage comprises a bottom seam along the inner layer means.

8. The hanging basket liner according to claim 7 wherein said flexible outer layer and said inner layer means are adapted for enabling manual puncturing thereof in order to enable placement of plants through the hanging basket liner.

9. A hanging basket liner comprising:

a flexible outer layer sized for lining a conventional wire hanging basket designed to hold plants and plant growing medium;

water resistant inner layer means, disposed on an interior surface of said flexible outer layer, for controlling water in the hanging basket by holding a water supply for a sufficient time to soak the growing medium while preventing waterlogging of plant roots; and means for permitting water drainage through the liner.

10. A hanging basket liner comprising:

a flexible outer layer sized for lining a conventional wire hanging basket designed to hold plants and plant growing medium, said outer layer being comprised of two sections of a non-woven fabric material;

water resistant inner layer means, made of a synthetic resinous film and disposed on an interior surface of said flexible outer layer, for controlling water in the hanging basket by holding a water supply for a sufficient time to soak the growing medium while preventing waterlogging of plant roots; and means for permitting water drainage through the hanging basket liner.

11. A hanging basket designed to hold plants and plant growth medium, said hanging basket comprising:
- a wire basket structure; and
- a liner, adapted for removable placement within said wire basket structure, said liner including
  - a flexible outer layer sized for substantially covering an interior surface of said wire basket structure,
  - water resistant inner layer means, disposed on an interior surface of said flexible outer layer, for controlling water in the hanging basket by holding a water supply for a sufficient time to soak the growing medium while preventing waterlogging of plant roots, and
- means for permitting water drainage through the liner.

* * * * *